Figure 1:
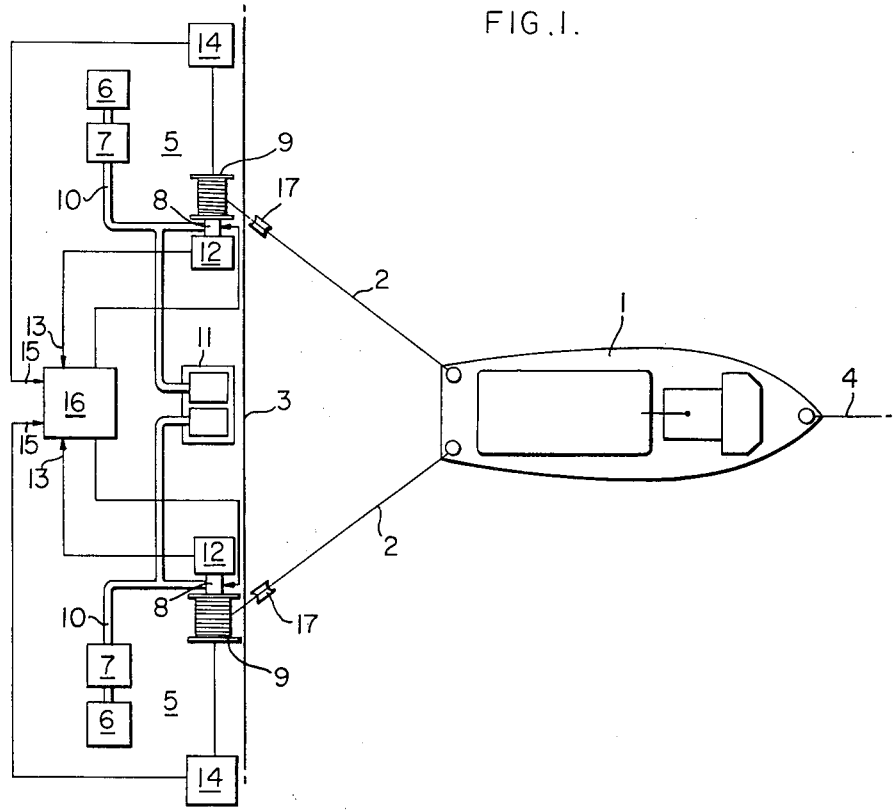

United States Patent [19]

Cunningham et al.

[11] 4,200,052
[45] Apr. 29, 1980

[54] SYSTEMS FOR CONTROLLING THE POSITION OF A MOORED FLOATING VESSEL

[75] Inventors: Sinclair U. Cunningham, Kinghorn; Donald Firth; Douglas Jackson, both of East Kilbride, all of Scotland

[73] Assignee: The Secretary of State for Industry in Her Britannic Majesty's Government of the United Kingdom of Great Britain and Northern Ireland, London, England

[21] Appl. No.: 860,518

[22] Filed: Dec. 14, 1977

[30] Foreign Application Priority Data

Dec. 14, 1976 [GB] United Kingdom ............... 52165/76

[51] Int. Cl.² .......................................... B63B 21/00
[52] U.S. Cl. .............................. 114/230; 254/173 R; 114/293; 114/247; 114/144 B
[58] Field of Search ............... 114/230, 293, 242, 247, 114/249, 253, 144 B; 254/173 R, 173 B; 9/8 P

[56] References Cited

U.S. PATENT DOCUMENTS

| 3,422,783 | 1/1969 | Moulin | 114/230 |
| 3,653,636 | 4/1972 | Burrell | 254/173 R |
| 3,780,989 | 12/1973 | Peterson | 254/173 R |
| 3,865,066 | 2/1975 | White | 114/230 |
| 3,886,887 | 6/1975 | Cunningham | 114/144 B |
| 3,917,230 | 11/1975 | Barron | 254/173 R |
| 3,965,841 | 6/1976 | Croese | 114/230 |
| 4,070,981 | 1/1978 | Guinn | 114/293 |

Primary Examiner—Charles E. Frankfort
Assistant Examiner—D. W. Keen
Attorney, Agent, or Firm—Pollock, Vande Sande and Priddy

[57] ABSTRACT

This invention provides a system which includes winding apparatus for hauling in and paying out a substantially inextensible steel rope tethering a floating vessel to a moorage or towing vessel, and a control system responsive to signals indicative of the tension in the steel rope and of the length of rope paid out for controlling the winding apparatus. There is also provided an energy reservoir for receiving and storing energy from the winding apparatus when the rope is paid out. The control system operates such that the tension in the steel rope does not exceed a predetermined value.

13 Claims, 4 Drawing Figures

SYSTEMS FOR CONTROLLING THE POSITION OF A MOORED FLOATING VESSEL

This invention relates to systems for controlling the position of a floating vessel which is tethered to a moorage or towing vessel by means of at least one steel rope, and particularly, but not exclusively to systems for controlling the position of a moored floating vessel which is subject to heavy sea conditions.

It is known to moor a floating vessel to a moorage by means of two polypropylene mooring lines attached to the stern of the vessel. The vessel is anchored at its bow and the main engines of the vessel are used to urge the vessel away from the moorage, and an auxiliary engine, known as a bow thruster, is used to urge the vessel towards the moorage. By manual control of the main engines and of the bow thruster the Captain of the vessel attempts to maintain the tension in the mooring lines approximately constant; however it is extremely difficult to achieve this for long periods in a heavy sea. Consequently the mooring lines frequently break under these conditions.

According to this invention there is provided a system for controlling the position of a floating vessel tethered by means of a line consisting of at least one substantially inextensible steel rope, comprising winding means for hauling in and paying out the line, an energy reservoir for receiving and storing energy from the winding means when the line is paid out and for supplying at least some of the energy required by the winding means when the line is hauled in, tension sensing means for generating signals indicative of the tension in the line, length sensing means for generating signals indicative of the difference in the length of the line between the winding means and the vessel from the length when the vessel is in its desired position, and a control system responsive to the signals generated by the tension sensing means to control the winding means so that the tension in the line does not exceed a predetermined value, and responsive to the signals generated by the length sensing means so that when the difference in length sensed has a positive value the winding means is caused to haul in the line subject to the overriding condition that the tension in the line does not exceed the predetermined value.

Preferably the floating vessel is tethered by means of two steel ropes; the system then further comprises winding means, tension sensing means, and length sensing means for the second rope; and the energy reservoir is arranged to receive, store and supply energy to both winding means; and the control system is arranged to be responsive to signals from the tension and length sensing means of both steel ropes to control the operation of the appropriate winding means.

The control system may control the winding means to haul in the steel rope such that the tension in the rope is maintained at a first or second predetermined value when the length difference sensed by the length sensing means is within a corresponding first or second range.

The control system may control the winding means to haul in the steel rope such that the tension in the rope is substantially proportional to the length difference sensed by the length sensing means.

Where the floating vessel is tethered to a moorage the control system may control one or both of the anchor windlass and the main engines of the floating vessel in order to control the tension in the steel rope.

The winding means conveniently comprises fast response hydraulic winches and these may be positioned on the floating vessel or on the moorage or on the towing vessel.

Figure 2:
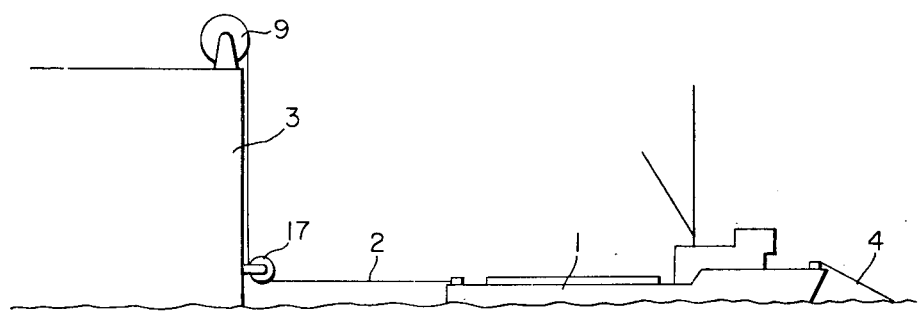
Figure 3:
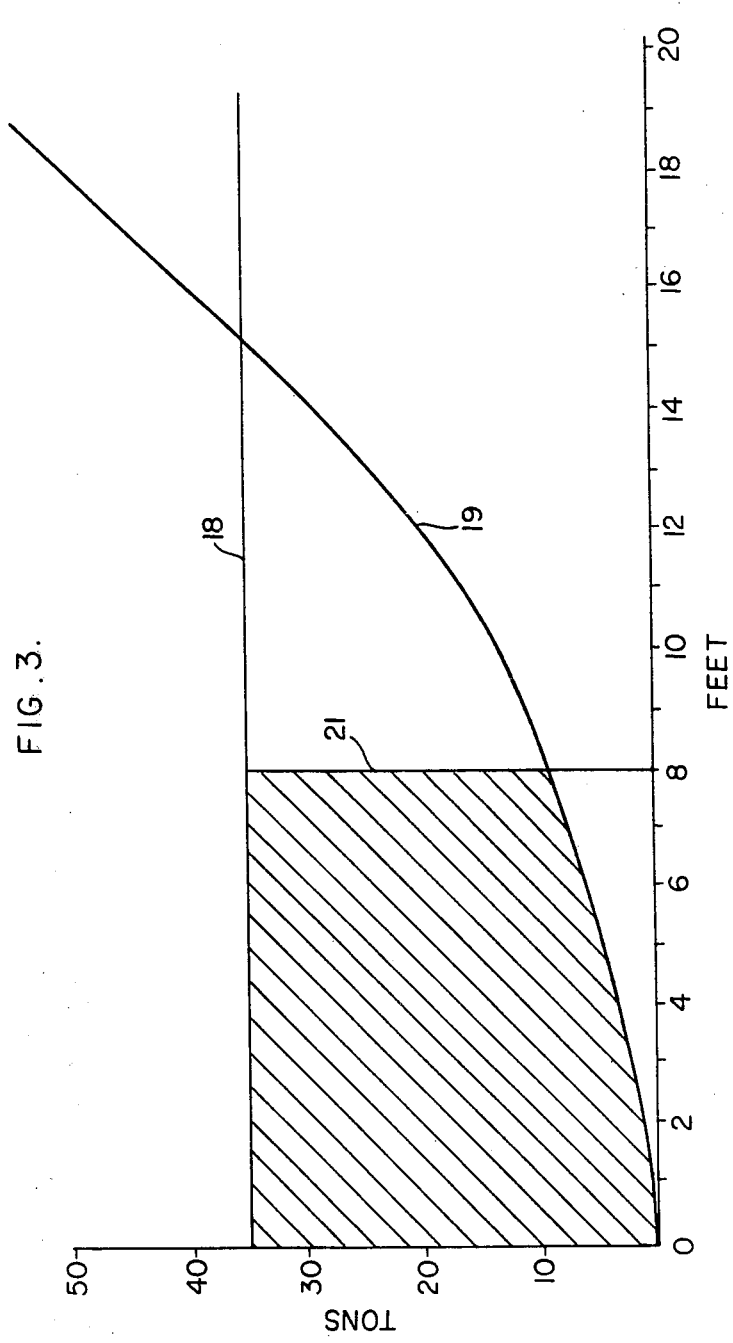
Figure 4:
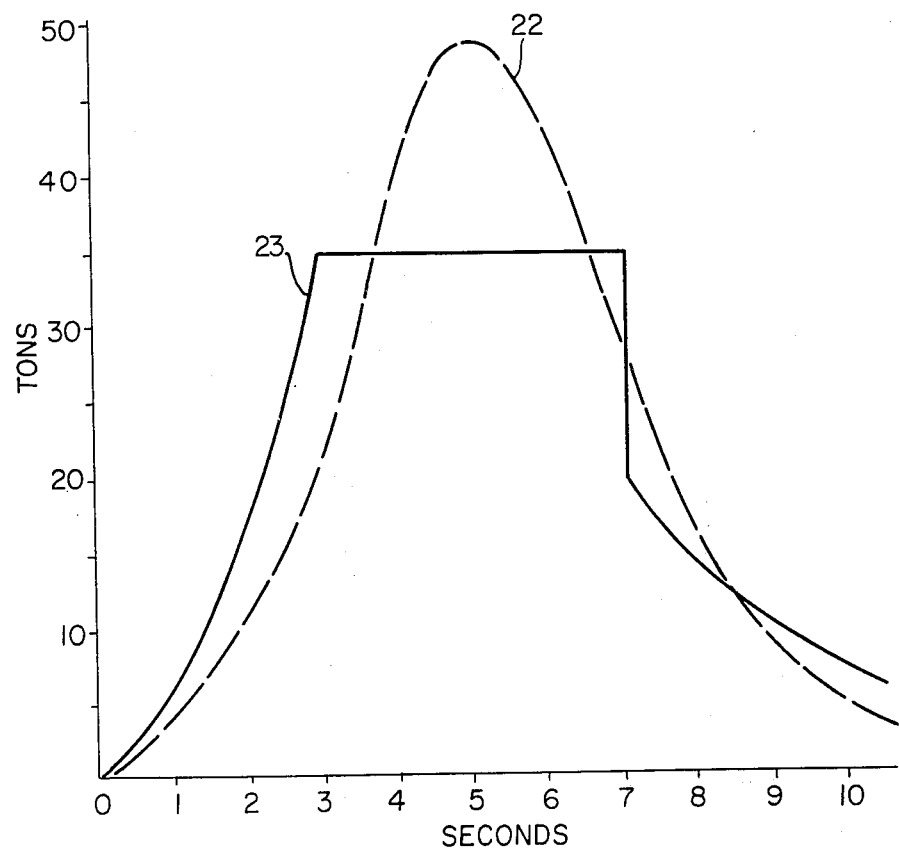

The invention will now be further described by way of example only and with reference to the accompanying drawings of which:

FIG. 1 shows, very diagrammatically, a plan view of a system in accordance with this invention, FIG. 2 shows, very diagrammatically, a side elevation of part of the system shown in FIG. 1, FIG. 3 is a graph comparing the energy requirements of a conventional system and a system according to this invention and FIG. 4 is a graph comparing the response of a conventional system and a system according to this invention.

FIG. 1 shows a floating vessel 1 moored by means of two steel ropes 2 to a moorage 3. The vessel is anchored by means of an anchor (not shown) which is attached to an anchor line 4 from its bow. Each rope 2 is connected to winding means which comprises a fast response hydraulic winch indicated generally by numeral 5. Each winch includes an electric motor 6, an hydraulic pump 7, an hydraulic motor 8 and a winding drum 9. In use, the electric motor 6 is energized from a power source (not shown) to drive the hydraulic pump 7 to pressurize the hydraulic oil in the pipe line 10 between the pump 7 and the hydraulic motor 8 to cause the motor 8 to rotate the winding drum 9 and thereby haul in the rope 2. Connected to the pipeline 10 is an energy reservoir 11 in which energy generated by the or each rope 2 paying out may be stored. When the rope 2 pays out it causes the drum 9 to rotate and thereby causes the motor 8 to act as a pump. When the motor 8 acts as a pump it pressurizes oil in the pipeline 10 and in the reservoir 11 where it is stored in its pressurized state until it is required to assist in the operation of the winch to haul in the rope 2.

When the motor 8 acts as a pump, the pump 7 is isolated by a non return valve (not shown) from the action of the pressurized oil in the pipeline 10. However, if at any time the pressure in the pipeline 10 falls below a predetermined value, automatically by means not shown, the electric motor 6 is energized and the non-return valve is opened so that the pump 7 can operate to raise the pressure in the pipeline 10 to the predetermined value.

Each winding means 5 is provided with tension sensing means 12 which generates signals on line 13 indicative of the tension in the corresponding rope 2. Length sensing means 14 are also provided for each winding means 5 for generating signals on line 15 indicative of the difference in the paid out length of the rope 2 from its length when the vessel 1 is in the desired position. Signals on lines 13 and 15 are fed to a control system 16.

The control system 16 is responsive to the signals from the tension sensing means 12 and controls the winding means 5 so that the tension in either of the ropes 2 does not exceed a predetermined value at any time during the operation of the system. The control system 16 is also responsive to the length sensing means 14 and when the length sensed has a positive value it causes the winding means 5 to haul in the appropriate rope 2 subject to the overriding condition that the tension in the rope does not exceed the predetermined value.

FIG. 2 shows very diagrammatically in side elevation part of the system shown in FIG. 1. The ropes 2 pass around sheaves 17 rotatably mounted in mountings which are fixed to the moorage 3.

In use, the floating vessel 1 has its engines operating to thrust the vessel away from the moorage 3 in a direction approximately normal to the moorage. The mooring ropes 2 are therefore under tension. Due to the effects of the water waves and wind upon the vessel the value of the tension in one or both of the ropes 2 may increase to the aforesaid predetermined value whereupon the control system 16 will transmit a signal to the corresponding one or both as appropriate of the hydraulic motors 8 to cause the or both ropes 2 to be paid out from the drums 9 while maintaining the value of the tension in the rope which is being paid out at the predetermined value. The value of the length of rope paid out is sensed by the length sensing means 14. The motor 8 acts as a pump when the rope is paid out and consequently the oil in the reservoir 11 is pressurized. The control system 16 may operate in two modes. In the first mode, when the water waves and winds permit, the rope which has been paid out is hauled in so that the tension in the rope is maintained at the predetermined value until the value of the length sensed by the length sensing means is within a predetermined range of the desired position, then the control system acts to maintain the tension at a second predetermined value lower than the aforesaid predetermined value. In the second mode the control system operates to cause the rope to be hauled in such that the tension in the rope is substantially proportional to the length of rope paid out, sensed by the length sensing means. In either mode, during the hauling in of the rope the system may utilize the energy stored in the reservoir 11 by means of the pressurized oil contained in the reservoir and thereby at least reduce the work done by the pump 7 and consequently the energy consumed by the electric motor 6 from its power source.

The hydraulic motors 8 may be of the variable displacement type. The tensions in the ropes may then be varied by varying the displacements of the motors. Alternatively the motors may be of the stepped displacement type and it is convenient to provide two such motors to drive each winding drum 9. Systems in accordance with this invention have been proposed in which the stepped displacement motors are similar dual displacement motors. In use one or both motors may be used to drive the winding drum. It has been proposed to employ, under normal conditions, one of the motors and only to switch in the second motor when position override means (see below) is actuated. The higher displacement of the first motor may be selected, in the case of a moored floating vessel, if the vessel is moored on the windward side of the moorage and the lower displacement may be selected if the vessel is moored on the lee side. When the vessel is moored by two steel ropes such that the wind beats against the side of the vessel the higher displacement may be selected for the upwind motor and the lower displacement may be selected for the downwind motor. Alternatively a range of four tensions may be provided by selecting the displacements and by the selection of one or both motors to drive the winding drum. Systems have also been proposed where the motors are again of the dual displacement type but have different displacements, for example in the ratios 1:2:4:8 thereby providing by means of the selection of the displacement and of the selection of one or both motors to drive the winding drum a choice of fifteen different torque outputs for a given input pressure.

It has been found that the input pressure to the motor or motors of the winding means varied due to the flow of oil to and from the energy reservoir and that this variation could be reduced by providing means for supplying pressurized gas to the energy reservoir. As a consequence the flow of oil to and from the reservoir makes only a small percentage change to the gas volume in the reservoir and thus reduces the variation in the input pressure.

Systems in accordance with this invention may be provided with position override means for increasing the tension in the ropes when the length difference sensed by the length sensing means 14 exceeds a predetermined positive value and for reducing the tension in the ropes when the length difference sensed numerically exceeds a predetermined negative value. The tension may be increased in a plurality of ways. For example the pump 7 could be caused to operate continuously to raise the input pressure to the motor 8. Alternatively, where so aforesaid similar dual displacement motors are provided, both motors could be operated simultaneously. Similarly the tension could be reduced in a plurality of ways. For example the pump 7 could be switched off and the input pressure allowed to fall. Alternatively, where as aforesaid similar dual displacement motors are provided, both motors could be by-passed by the pressurized hydraulic oil.

FIG. 3 is a graph showing the comparison in energy requirements between a system in accordance with this invention using steel ropes, and a conventional system using similar lengths and configuration of mooring ropes wherein the mooring ropes are, however, of polypropylene. Along the Y ordinate of the graph has been plotted the tension in tons in a mooring rope with a horizontal line 18 indicating the predetermined tension at which the control system will pay out the mooring rope. Along the X ordinate has been plotted in the case of the conventional system the extension in feet of a mooring rope and in the case of a system in accordance with this invention the length sensed by the length sensing means.

FIG. 4 is a graph comparing the response of the conventional system, curve 22, and the system in accordance with this invention curve 23. In the figure along the Y ordinate has been plotted the tension in tons in the mooring ropes and along the X ordinate time in seconds. It is assumed that the period of the water waves which are disturbing the vessel from its position are approximately 10 seconds.

From FIGS. 3 and 4 it will be seen that as the water wave reaches its peak after about 5 seconds the tension in the mooring rope of the conventional system reaches its peak of about 50 tons and that the rope has been extended by 18 feet (curve 19, FIG. 3) and therefore the floating vessel has moved out of position. The energy gained from the effect of the water waves upon the vessel and mooring system is stored in the extended polypropylene rope. In the case of the system in accordance with this invention the steel ropes used may be considered to be inextensible and the tension in the rope will build up faster than in the conventional system, and the predetermined tension will be reached after about 3 seconds of the wave period at which time the winding means will pay out the rope. Slightly less than 8 feet of steel rope needs to be paid out before the water waves permit the winding means to haul in the rope to restore the vessel to its original position. When the vessel is approximately at its original position, which is after about 7 seconds, the control system operates to reduce the tension in the mooring rope (that is the control system is working in the aforesaid first mode). The energy gained by the mooring system when the rope has been paid out is equal to the area of FIG. 3 bounded by the line 18, X and Y ordinates and the vertical line 21 which indicates the length sensed by the length sensing means at which the control system operates to haul in the rope. The energy required to restore the vessel to its original position is equal to the area of FIG. 3 which is bounded by the X ordinate, the vertical line 21 and the curve 19. The curve 19 shows the behaviour of a conventional system in which there is no net energy gain by the system during the period of a water wave. The shaded area of FIG. 3 is therefore equal to the energy gained by the system in accordance with this invention during the wave period.

The components employed in the system of the present invention are, per se, all well known. The variable displacement hydraulic motors 8 can take the form shown in FIG. 1 of Burrell U.S. Pat. No. 3,653,636. The control system 16 can take the form shown in FIG. 1 of Jones U.S. Pat. No. 3,740,741, in FIG. 3 of Pangalila U.S. Pat. No. 3,580,207, and in FIGS. 5 and 6 of Born et al Canadian Pat. No. 822,437. The tension sensing means 12 can take the form shown in FIGS. 2–6 of Vincent U.S. Pat. No. 3,248,937, and the length sensing means 14 can take the form shown in Cunningham et al U.S. Pat. No. 3,886,887. The gas pressurizing means can take the form of the gas pressurized hydraulic accumulator shown in the aforementioned Burrell patent. The electric motors 6 and hydraulic pumps 7 are conventional.

What we claim is:

1. A system for controlling the position of a floating vessel tethered to a moorage by means of a substantially inextensible steel rope comprising:
   a. winding means located on the moorage for hauling in and paying out the steel rope,
   b. an energy reservoir on the moorage for receiving and storing energy from said winding means when the rope is paid out and for supplying at least some of the energy required by said winding means when the rope is hauled in,
   c. tension sensing means for generating signals indicative of the tension in said steel rope,
   d. length sensing means for generating signals indicative of the difference in the length of the steel rope between the said winding means and the said floating vessel from the length when the said vessel is in its desired position, and
   e. a control system responsive to the signals generated by said tension sensing means to control said winding means so that the tension in said steel rope does not exceed a predetermined value and responsive to the signals generated by said length sensing means so that when the difference in length sensed has a positive value the said winding means is caused to haul in the steel rope subject to the overriding condition that the tension in the said rope does not exceed the said predetermined value.

2. A system according to claim 1 for controlling the position of a floating vessel tethered by means of two steel ropes, in which there is provided respective winding means, tension sensing means and length sensing means for each of said steel ropes, said energy reservoir, in use, being operative to receive, store and supply energy to both winding means, and said control system being responsive to signals from both of said length and tension sensing means to control the operation of the respective winding means.

3. A system according to claim 1 in which said control system, in use, is operative to control said winding means to haul in the said steel rope such that the tension in the rope is maintained at a first or second predetermined value when the length difference sensed by the length sensing means is within a corresponding first or second range.

4. A system according to claim 1 in which the control system, in use, controls the winding means to haul in the said steel rope such that the tension in the rope is substantially proportional to the length difference sensed by the length sensing means.

5. A system according to claim 1 in which the winding means includes a winding drum upon which the steel rope may be wound when the drum is driven, and a hydraulic motor for driving said winding drum.

6. A system according to claim 5 in which the hydraulic motor is of the variable displacement type.

7. A system according to claim 5 in which there is provided a further hydraulic motor for driving the winding drum and in which both motors are of the stepped displacement type.

8. A system according to claim 7 in which the motors have similar displacements.

9. A system according to claim 7 in which the control system, in use, is operative to select the displacements and to actuate one or both motors so that a selected one of a plurality of tensions is produced in the steel rope by the winding drum being driven by said one or both motors.

10. A system according to claim 5 in which the winding means includes a pump for supplying hydraulic oil to the hydraulic motor and a conduit for conducting the oil between the pump and motor and in which the energy reservoir includes a container, for connection to said conduit, for containing pressurized hydraulic oil provided by the pump or by the motor when the line is paid out.

11. A system according to claim 10 in which the energy reservoir includes means for supplying pressurized gas to said container.

12. A system according to claim 10 in which there is provided pressure sensing means for operating said pump to maintain the pressure of the hydraulic oil in the container and conduit substantially at a predetermined value.

13. A system according to claim 1 in which the control system includes position override means for controlling the winding means to increase the tension in the steel rope when the length difference sensed exceeds a predetermined positive value and for controlling the winding means to reduce the tension in the rope when the length difference sensed numerically exceeds a predetermined negative value.

* * * * *